3,775,382
PROCESS FOR MAKING HALOGENATED POLY-
ARYLENE-1,3,4-OXADIAZOLES
Donald Lithgow Brydon, Abergavenny, England, assignor to Imperial Chemical Industries Limited, London, England
No Drawing. Filed May 12, 1972, Ser. No. 252,571
Claims priority, application Great Britain, May 14, 1971, 14,873/71; Nov. 19, 1971, 53,814/71
Int. Cl. C08g 33/04
U.S. Cl. 260—78.4 R                5 Claims

ABSTRACT OF THE DISCLOSURE

Halogenated polyarylene-1,3,4 - oxadiazole polymers having improved flammability properties compared with the corresponding unhalogenated polymers. The halogen content is at least 2% by weight. Halogens are selected from bromine, iodine, chlorine, and a mixture of all or any two of these. Fibres from halogenated polymers of inherent viscosity >1 are strong and readily drawable.

---

This invention relates to polymers of good stability to heat and resistance to burning, and more particularly to halogenated polyarylene-1,3,4-oxadiazoles, to methods for their manufacture and to methods for their conversion into fibrous form.

It has already been proposed to make certain polyarylene-1,3,4-oxadiazoles, for example poly-1,4-phenylene-2,5-(1,3,4-oxadiazole), as polymers of good stability to heat. It has also been proposed to convert certain copolyoxadiazoles, for example that made by reacting a mixture of terephthalic and isophthalic acids with hydrazile sulphate in 30% oleum, into fibrous form by spinning an oleum solution into an aqueous coagulating bath. Such polymers as have been described hitherto, although having good heat stability, will ignite when brought into contact with a flame and will continue to burn. Polymers and particularly synthetic polymeric fibres having self-extinguishing properties, that is to say polymers or fibres which ignite on contact with a flame but which cease burning when the flame is removed, are particularly sought after. They are of particular value in a variety of uses, for example in making upholstery fabrics or articles such as curtains for use in situations where there may be high fire risks, for example in public buildings and in aircraft.

The present invention provides polyarylene-1,3,4-oxadiazoles having improved flammability properties, namely halogenated polyarylene-1,3,4-oxadiazoles. The substituted halogen in the polymers of the invention is selected from bromine, iodine and chlorine, or is a mixture of all or any two of these halogens.

More specifically, a halogenated polyarylene-1,3,4-oxadiazole is provided wherein the polyarylene-1,3,4-oxadiazole has the characteristic repeating unit

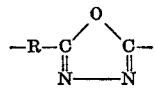

in which R is an arylene radical and at least one hydrogen atom of the arylene radical R in at least some of the repeating units is replaced by a halogen selected from bromine, iodine and chlorine, or all or any two of these halogens, the halogen content of the polymer being at least 2% by weight and the ratio of the total number of halogen atoms to the total number of repeating units is less than one.

A halogen content of at least 2% by weight in the halogenated polymer confers a significant decrease in the flammability properties thereof compared with the unhalogenated polymer. Preferably, the halogen content is such as to render the halogenated polymer self-extinguishing; for example, a brominated polymer should have a bromine content of at least 4%, a chlorinated polymer should have a chlorine content of at least 7%, and an iodinated polymer such have an iodine content of at least 7%.

The halogenated polyarylene-1,3,4-oxadiazoles of the invention may be made by reacting a halogenated aromatic dicarboxylic acid with a hydrazine salt, especially hydrazine sulphate, in oleum. In making homopolymers, a mixture of halogenated and unhalogenated aromatic dicarboxylic acids, or a partially halogenated aromatic dicarboxylic acid, may be used in preference to a monohalogenated aromatic dicarboxylic acid.

One method of making the halogenated polyarylene-1,3,4-oxadiazoles of the invention is to add halogen to a solution of an aromatic dicarboxylic acid or a mixture of aromatic dicarboxylic acids in oleum in an amount sufficient to give the desired proportion of halogen in the final polymer and to agitate until the halogenation reaction is complete. The reaction may take place at ordinary temperature or below (say, from 0° C.) but moderately elevated temperatures, say up to 100° C., give a more rapid reaction. Times may vary from a few minutes up to several hours. A hydrazine salt is then added and the mixture heated until the formation of the polyoxadiazole is complete. Heating normally takes place in the temperature range 80° C. to 160° C. for times which normally vary between 2 and 24 hours. The heating may take place at atmospheric pressure, but the use of increased or diminished pressure is possible. When the reaction is complete the reaction mixture may be cooled. The polymer may be isolated if desired by pouring the oleum solution on to water or ice, followed by filtration of the precipitated solid and washing it free from acid with water. The hydrazine salt is preferably hydrazine sulphate. It is possible, of course, to add hydrazine itself or hydrazine hydrate, in which case the sulphate is formed in situ and appropriate adjustment must be made to the oleum charge.

The oleum used may, for example, be of 30% strength but it is advantageous to use a weaker oleum of, say, 5% to 20% strength.

A preferred method of making halogenated polyarylene-1,3,4-oxadiazoles, more particularly the bromine and/or iodine derivatives, constitutes another aspect of the invention. Such method comprises forming a polyarylene-1,3,4-oxadiazole and then halogenating the polymer in oleum by adding a sufficient amount of bromine, or iodine, or both such that the final polymer has a halogen content of at least 2% by weight.

Of particular importance in our invention are those halogenated polymers based on poly-1,4- or 1,3-phenylene-2,5-(1,3,4-oxadiazole) made from terephthalic acid or isophthalic acid respectively, or based on copolymers made from various mixtures of terephthalic and isophthalic acids.

Halogenated polyarylene-1,3,4-oxadiazoles having fibre- or film-forming properties shoud have an inherent viscosity greater than 0.4, preferably greater than 1.0. Such polymers may be spun into filaments by spinning an oleum or sulphuric acid solution thereof into an aqueous coagulating bath. Polymers made by the preferred method of the invention are particularly suitable for spinning into fibrous form. It will in many cases be convenient to use the oleum or sulphuric acid solution in which the polymer is formed for spinning into an aqueous coagulating bath without intermediate isolation of the polymer.

The filaments so obtained are strong and readily drawn and have enhanced physical properties compared with filaments from the corresponding unhalogenated polymers.

Inherent viscosity has been determined in accordance with the formula $$\eta_{inh} = \frac{\ln\left(\frac{t\ soln.}{t\ solv.}\right)}{C}$$

where

*t* soln. is the flow time in a viscometer of a dilute solution of the polymer.
*t* solv. is the flow time in a viscometer of the pure solvent.
C is the concentration of the polymer in solution; generally 0.5 gms. polymer in 100 mls. of solution.

These measurements are made at a temperature of 25° C. The inherent viscosities of the halogenated polyarylene-1,3,4-oxadiazoles were measured in 98% sulphuric acid.

The invention will be further described with reference to the following examples, in which all inherent viscosity values were measured as hereinbefore described.

EXAMPLE 1

A mixture of terephthalic acid (26.56 parts), 20% oleum (262 parts), bromine (0.7 part) and iodine (0.02 part) was heated at 50–60° C. for 30 minutes. After cooling to 30° C. hydrazine sulphate (21.236 parts) was added and the temperature was raised to 130° C. and maintained at 130° C. for 4 hours. In both stages of the reaction above stirring was effected with a mechanical stirrer.

The product was a viscous solution which yielded strong fibres on spinning into water.

The inherent viscosity of the polymer was 1.5 and it contained 2.75% bromine.

The polymer was of reduced flammability as compared to unsubstituted polyphenyleneoxadiazole.

EXAMPLE 2

A mixture of terephthalic acid (17.70 parts), 2,5-dichloroterephthalic acid (8.35 parts), hydrazine sulphate (18.85 parts) and 20% oleum (500 parts) was stirred at 130° C. for 4 hours.

The product was a viscous solution which yielded strong fibres on spinning into water or aqueous sulphuric acid.

The inherent viscosity of the polymer was 1.3. Analysis indicated that the polymer contained 10.2% of chlorine.

The polymer was of reduced flammability as compared to unsubstituted polyphenyleneoxadiazole.

EXAMPLE 3

A mixture of hydrazine sulphate (20.92 parts), terephthalic acid (26–56 parts) and 20% oleum (500 parts) was stirred and heated at 130° C. for 3½ hours. To an aliquot (255 parts) of the resulting polymer solution was added iodine (1.07 parts) and the reaction mixture was stirred and heated at 50° C. for 2 hours and then at 130° C. for 2 hours. All the reactions were protected from atmospheric moisture.

The resulting polymer had an iodine content of 7.7% and an inherent viscosity of 1.7. The polymer was of reduced flammability as compared to unsubstituted polyphenyleneoxadiazole and when the oleum dope was spun into water or aqueous sulphuric acid strong fibres were obtained.

EXAMPLE 4

A mixture of terephthalic acid (26.56 parts), hydrazine sulphate (21.05 parts) and 20% oleum (500 parts) was stirred and heated at 130° for four hours in an apparatus protected from atmospheric moisture. After cooling to room temperature, bromine (3.12 parts) was added. The mixture was stirred and maintained at 30–40° C. for three hours and then at 130° C. for one hour.

The resultant polymer had a bromine content of 8.8% and an inherent viscosity of 1.55. The polymer was of reduced flammability as compared to unsubstituted polyphenyleneoxadiazole.

EXAMPLE 5

A mixture of terephthalic acid (318.7 parts), hydrazine sulphate (254.6 parts) and 20% oleum (6000 parts) was raised to a temperature of 130° C. and maintained for four hours. After cooling to 20° C. bromine (34.3 parts) was added and the temperature raised to 130° C. in 5 hours and maintained for 30 minutes. In both stages of the reaction above stirring was effected with a mechanical stirrer using a reaction vessel protected from the atmosphere.

The product was a solution with a viscosity of 1805 poise at 25° C. It yielded strong fibres on spinning into water or aqueous sulphuric acid.

The inherent viscosity of the polymer was 2.0 before bromination and 1.8 after bromination. The polymer contained 8.7% bromine.

The polymer was of reduced flammability as compared to the unsubstituted polyphenyleneoxadiazole.

EXAMPLE 6

A mixture of isophthalic acid (26.56 parts), 20% oleum (500 parts) and hydrazine sulphate (a total of 22.89 parts) was raised to a temperature of 130° C. and maintained for a total of 19 hours. After cooling to 20° C. bromine (3.12 parts) was added and the temperature maintained at 30–40° C. for 3 hours. The temperature was raised to 130° C. and maintained for one hour. In both stages of the reaction above stirring was effected with a mechanical stirrer using a reaction vessel protected from the atmosphere.

The product was a solution with a viscosity of 67 poise at 25° C. It yielded weak films on quenching into water or aqueous sulphuric acid.

The inherent viscosity of the polymer was 0.9 and it contained 8.0% bromine.

The polymer was of reduced flammability as compared to the unsubstituted polyphenyleneoxadiazole.

EXAMPLE 7

A mixture of hydrazine sulphate (42.48 parts) terephthalic acid (39.84 parts), isophthalic acid (13.28 parts) and 20% oleum (.1000 parts) was raised to a temperature of 130° C. and maintained for four hours. After cooling to 20° C. bromine (6.24 parts) and iodine (0.08 part) was added. The temperature was maintained at 40° C. for 2½ hours, then raised to 130° C. and maintained at 130° C. for one hour. In both stages of the reaction above stirring was effected with a mechanical stirrer using a reaction vessel protected from the atmosphere.

The product was a solution with a viscosity of 340 poise at 25° C. It yielded strong fibre on quenching into water or aqueous sulphuric acid.

The inherent viscosity of the polymer was 1.5 and it contained 9.6% bromine.

The polymer was of reduced flammability as compared to the unsubstituted polyphenyleneoxadiazole.

EXAMPLE 8

A mixture of terephthalic acid (39.84 parts) isophthalic acid (13.28 parts), 20% oleum (1000 parts) and hydrazine sulphate (a total of 42.90 parts) was raised to a temperature of 130° C. and maintained for seven hours. After cooling to 20° C. bromine (6.24 parts) and iodine (0.08 part) was added. The temperature was maintained at 40° C. for 2½ hours, then raised to 130° C. and maintained for one hour. In both stages of the reaction above stirring was effected with a mechanical stirrer using a reaction vessel protected from the atmosphere.

The product was a solution with a viscosity of 720 poise at 25° C. It yielded strong fibre on quenching into water or aqueous sulphuric acid.

The inherent viscosity of the polymer was 1.9 and it contained 10.0% bromine.

The polymer was of reduced flammability as compared to the unsubstituted polyphenyleneoxadiazole.

EXAMPLE 9

A mixture of terephthalic acid (21.33 parts) naphthalene 2.6 dicarboxylic acid (3.08 parts) hydrazine sulphate (19.18 parts) and 20% oleum (573 parts) was raised to a temperature of 130° C. and maintained for four hours.

To an aliquot (379 parts) of the above solution at 20° C. was added bromine (2.18 parts). The temperature was maintained at 40° C. for three hours and raised to 130° C. and maintained for one hour. In both stages of the reaction above stirring was effected with a mechanical stirrer using a reaction vessel protected from the atmosphere.

The product was a solution with a viscosity of 240 poise at 25° C. It yielded strong fibre on spinning into water or aqueous sulphuric acid.

The inherent viscosity of the polymer is 1.5 before bromination and 1.4 after. The polymer contained 11.0% bromine.

The polymer was of reduced flammability as compared to the unsubstituted polymer.

EXAMPLE 10

A mixture of terephthalic acid (26.56 parts) hydrazine sulphate (21.05 parts) and 20% oleum (500 parts) was raised to a temperature of 130° C. and maintained for four hours. After cooling to 20° C. bromine (3.12 parts) was added. The temperature was maintained at 30–40° C. for three hours then raised to 130° C. and maintained for one hour. After cooling to 20° C. iodine (1.60 parts) was added. The temperature was maintained at 30° C. for three hours then raised to 130° C. and maintained for one hour. In all stages of the above reaction stirring was effected with a mechanical stirrer using a reaction vessel protected from the atmosphere.

The product was a viscous solution. It yielded strong fibre on spinning into water or aqueous sulphur acid.

The inherent viscosity of the polymer was 1.5. The polymer contained 8.0% bromine and 5.2% iodine.

The polymer was of reduced flammability as compared to the unsubstituted polymer.

Flammability testing on the halogenated polymers of the foregoing examples was effected as follows:

A thin film of the polymer was cast from its oleum solution with a glass plate. The film was precipitated with water and subsequently washed with water over a period of 72 hours to remove sulphuric acid. After drying the film in a vacuum oven, its flammability behaviour was compared with that of an unhalogenated standard by impinging one end of a strip of the film in a gas flame (carried out at 45° to the vertical).

What we claim is:

1. A process for making a halogenated polyarylene-1,3,4-oxadiazole by first forming the polyarylene-1,3,4-oxadiazole and then halogenating it in oleum by adding bromine or iodine or a mixture thereof in an amount sufficient to give a halogen content in the final polymer of at least 2% by weight.

2. A process for making a halogenated polyarylene-1,3,4-oxadiazole of inherent viscosity greater than 1.0 (in 98% sulphuric acid at 25° C. and at a concentration of 0.5 gram per 100 mls. of solution) by reacting aromatic dicarboxylic acid with hydrazine salt in oleum, and then halogenating the polyarylene-1,3,4-oxadiazole in solution in the oleum by adding bromine or iodine or a mixture thereof in an amount sufficient to give a halogen content in the final polymer of at least 2% by weight.

3. A process according to claim 2, wherein the aromatic dicarboxylic acid is constituted by terephthalic acid, or isophthalic acid, or a mixture of these acids.

4. A process according to claim 2, wherein the oleum is 5% to 20% strength.

5. A process according to claim 2, wherein shaped articles are produced by spinning the solution into water or aqueous sulphuric acid.

References Cited

UNITED STATES PATENTS

| | | | |
|---|---|---|---|
| 3,275,608 | 9/1966 | Montgomery | 260—78.4 |
| 3,238,183 | 3/1966 | Frazer | 260—78.4 |
| 3,567,698 | 3/1971 | Kovacs et al. | 260—78.4 |

OTHER REFERENCES

Journal of Polymer Science: Part A, vol. 3, pp. 45–53, 1965; I. Wakura et al.

Journal of Applied Polymer Science, vol. 14, pp. 225–229, 1970.

JOSEPH A. SCHOFER, Primary Examiner

J. KIGHT, Assistant Examiner

U.S. Cl. X.R.

260—30.8, 78 R